US007813362B2

(12) United States Patent
Ikeda et al.

(10) Patent No.: US 7,813,362 B2
(45) Date of Patent: Oct. 12, 2010

(54) COMMUNICATION APPARATUS, ELECTRONIC APPARATUS, IMAGING APPARATUS

(75) Inventors: Junichi Ikeda, Miyagi (JP); Koji Oshikiri, Miyagi (JP); Koji Takeo, Miyagi (JP); Noriyuki Terao, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 855 days.

(21) Appl. No.: 11/327,460

(22) Filed: Jan. 9, 2006

(65) Prior Publication Data

US 2006/0173986 A1 Aug. 3, 2006

(30) Foreign Application Priority Data

Jan. 17, 2005 (JP) ............................. 2005-008873

(51) Int. Cl.
*H04L 12/00* (2006.01)
(52) U.S. Cl. ................... 370/412; 710/316; 710/317
(58) Field of Classification Search ............... 370/357, 370/412; 358/1.15, 1.12, 1.14; 710/310, 710/305, 104
See application file for complete search history.

(56) References Cited

U.S. PATENT DOCUMENTS 6,317,427 B1 * 11/2001 Augusta et al. ............. 370/357
6,486,970 B1 * 11/2002 Oak ......................... 358/1.15
7,058,738 B2 * 6/2006 Stufflebeam, Jr. ........... 710/104
7,120,711 B2 * 10/2006 Schaefer et al. ............. 710/104
2001/0040692 A1 * 11/2001 Matsueda et al. .......... 358/1.14
2003/0197882 A1 * 10/2003 Tsukuba et al. ............ 358/1.12
2004/0019726 A1 * 1/2004 Kelley et al. ............... 710/305
2004/0172493 A1 * 9/2004 Askar ........................ 710/305
2004/0263903 A1 * 12/2004 Oikawa ..................... 358/1.15
2005/0248584 A1 11/2005 Takeo et al.
2005/0254085 A1 11/2005 Oshikiri et al.
2007/0112995 A1 * 5/2007 Manula et al. .............. 710/310

OTHER PUBLICATIONS

U.S. Appl. No. 10/937,284, filed Sep. 10, 2004, Unknown.

* cited by examiner

*Primary Examiner*—Dang T Ton
*Assistant Examiner*—Lionel Preval
(74) *Attorney, Agent, or Firm*—Oblon, Spivak, McClelland, Maier & Neustadt, L.L.P.

(57) ABSTRACT

A communication apparatus is disclosed that includes a transmission circuit configured to transmit transmission data to a communication counterpart; a reception circuit configured to receive reception data from the communication counterpart; a storage device configured as at least two buffers including a transmission buffer that stores the transmission data and a reception buffer that stores the reception data; and an address mapping unit configured to perform address mapping of the buffers including the transmission buffer and the reception buffer on the storage device, and adjust the storage capacity of the transmission buffer and the storage capacity of the reception buffer.

16 Claims, 19 Drawing Sheets

FIG.14

| STATE | MODE | TIME REQUIRED FOR RECOVERING TO L0 |
|---|---|---|
| L0 | ACTIVE (NORMAL) | |
| L0s | LINK: COMMON MODE VOLTAGE CLOCK, MAIN POWER: ON | 16ns ~ 4μs |
| L1 | LINK: COMMON MODE VOLTAGE CLOCK: OFF, MAIN POWER: ON | 1 ~ SEVERAL DOZEN μs |
| L2 | CLOCK, MAIN POWER: OFF PROVIDE AUXILIARY POWER (Vaux) IF AVAILABLE | DEPENDS ON SYSTEM |

COMMUNICATION APPARATUS, ELECTRONIC APPARATUS, IMAGING APPARATUS

BACKGROUND OF THE INVENTION

1. Field of the Invention

The present invention relates to a communication apparatus, an electronic apparatus including such a communication apparatus, and an imaging apparatus.

2. Description of the Related Art

The PCI Express (registered trademark) interface is being proposed as the next generation high speed serial interface succeeding the PCI bus scheme (e.g., see "Outline of the PCI Express Standard," Takashi Satomi, Interface, July 2003).

According to the PCI Express standard, a serial communication circuit is provided in a communication device corresponding to an end point or a Root Complex. The serial communication circuit includes a transmission circuit for transmitting packet data and a reception circuit for receiving data. The transmission circuit includes a transmission buffer for buffering transmission data, and the reception circuit includes a reception buffer for buffering reception data.

In such a communication device conforming to the PCI Express standard, it is difficult to set suitable storage capacities for the transmission buffer and the reception buffer. Specifically, if the storage capacities of these buffers are arranged to be relatively small, transmission and reception of data may be hindered and the performance of the communication device may be degraded. On the other hand, when the storage capacities of the buffers are arranged to be relatively large, large-capacity storage devices have to be used thereby leading to an increase in fabrication cost.

The storage capacities of the buffers are preferably arranged to be large so as to increase the versatility of the communication device. However, increasing the storage capacities of the buffers leads to an increase in fabrication cost as is described above. Thus, it is not suitable to fix the storage capacities of the transmission buffer and the reception buffer included in the communication device.

SUMMARY OF THE INVENTION

Accordingly, the present invention provides a technique for arranging a transmission buffer and a reception buffer within one storage device and allowing the storage capacities of the respective buffers to vary so that good cost performance may be maintained for the transmission buffer and the reception buffer while reducing fabrication costs.

According to one embodiment of the present invention, a communication apparatus is provided that includes a transmission circuit configured to transmit transmission data to a communication counterpart;

a reception circuit configured to receive reception data from the communication counterpart;

a storage device configured as at least two buffers including a transmission buffer that stores the transmission data and a reception buffer that stores the reception data; and an address mapping unit configured to perform address mapping of the buffers including the transmission buffer and the reception buffer in the storage device, and adjust a storage capacity of the transmission buffer and a storage capacity of the reception buffer.

According to another embodiment of the present invention, an electronic apparatus is provided that includes more than one of the communication apparatuses of the present invention that are configured to communicate with each other.

According to another embodiment of the present invention, an imaging apparatus is provided that includes a scanner that scans a document, a plotter that forms an image of the scanned document, and a controller that controls operations of the scanner and the plotter, wherein each of the scanner, the plotter, and the controller includes the communication apparatus of the present invention.

According to one aspect of the present invention, by using one storage device as a transmission buffer and a reception buffer, performing address mapping of the transmission buffer and the reception buffer, and adjusting the storage capacities of the transmission buffer and the reception buffer, performance of the transmission buffer and the reception buffer may be maintained while reducing fabrication costs.

BRIEF DESCRIPTION OF THE DRAWINGS

FIG. 14 is a table indicating definitions of link states used in the PCI Express link;

DESCRIPTION OF THE PREFERRED EMBODIMENTS

In the following, preferred embodiments of the present invention are described with reference to the accompanying drawings.

First, the PCI Express standard is described below under the sections [Outline of PCI Express Standard] to [PCI Express Architecture]. Then, a digital copier as one preferred embodiment of the present invention is described under the section [Digital Copier].

[Outline of PCI Express Standard]

An embodiment of the present invention relates to application of the PCI Express (registered trademark) corresponding to one type of high speed serial bus. In the following, an outline of the PCI Express standard is described with reference to excerpts of the document "Outline of the PCI Express Standard" cited above. It is noted that a high speed serial bus refers to an interface that enables data exchange at high speed (i.e., at least 100 Mbps) through serial transmission using one transmission channel.

The PCI Express, which is a successor of the PCI bus, is designed to be adaptable to computers in general. The PCI Express is characterized by realizing low voltage differential signal transmission, individual communication channels for point-to-point transmission/reception, packetized split transactions, and high scalability with respect to differences in link configurations, for example.

Figure 1:
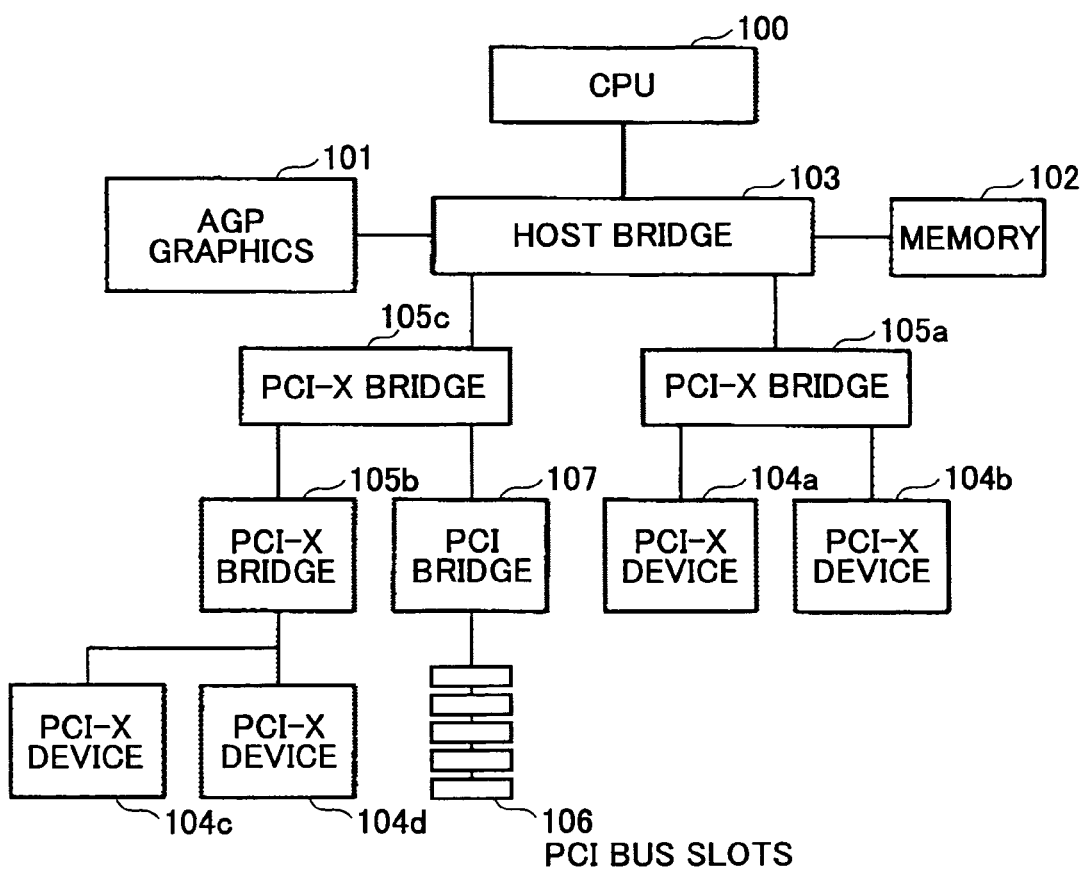
FIG. 1 is a block diagram showing a structure of a PCI system.
Figure 2:
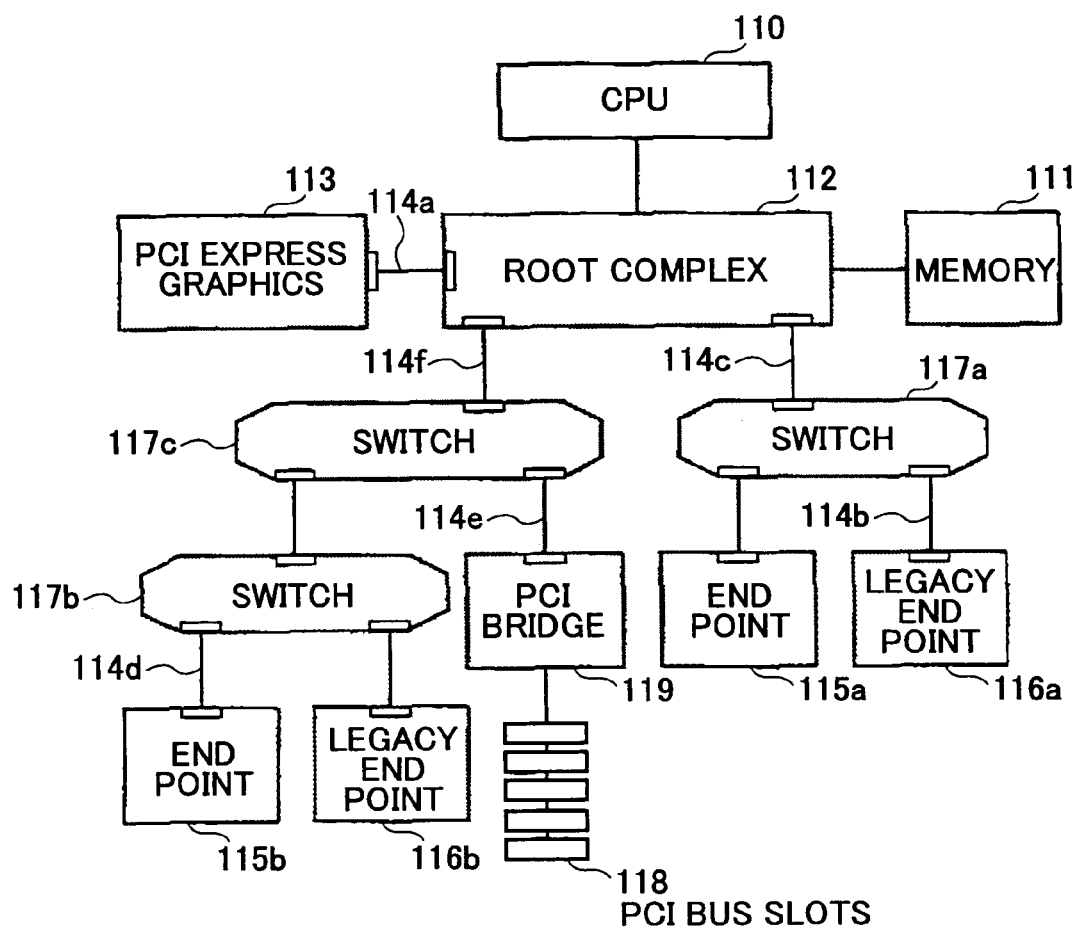
FIG. 2 is a block diagram showing a structure of a PCI Express system.

FIG. 1 is a block diagram showing an exemplary structure of a PCI system, and FIG. 2 is a block diagram showing an exemplary structure of a PCI Express system.

In the PCI system of FIG. 1, a CPU 100, an AGP graphics unit 101, and a memory 102 are connected to a host bridge 103, and a tree structure is realized by connecting PCI-X (PCI-Extended: upward compatibility standard of PCI) devices 104a and 104b to the host bridge 103 via a PCI-X bridge 105a, connecting PCI-X devices 104c and 104d to a PCI-X bridge 105c, which in turn is connected to the host bridge 103 via a PCI-X bridge 105c, and connecting PCI bus slots 106 to a PCI bridge 107, which in turn is connected to the host bridge 103 via the PCI-X bridge 105c.

In the PCI Express system of FIG. 2, a CPU 110 and a memory 111 are connected to a root complex 112, and a tree structure is realized by connecting a PCI Express graphics unit 113 to the root complex 112 via a PCI Express link 114a, connecting an end point 115a and a legacy end point 116a via PCI Express links 114b to a switch 117a, which in turn is connected to the root complex 112 via a PCI Express link 114c, connecting an end point 115b and a legacy end point 116b via PCI Express links 114d to a switch 117b, which in turn is connected to a switch 117c via a PCI Express link 114e, connecting PCI bus slots 118 to a PCI bridge 119 which is connected to the switch 117c via the PCI express links 114e, and connecting the switch 117c to the root complex 112 via a PCI express link 114f.

Figure 3:
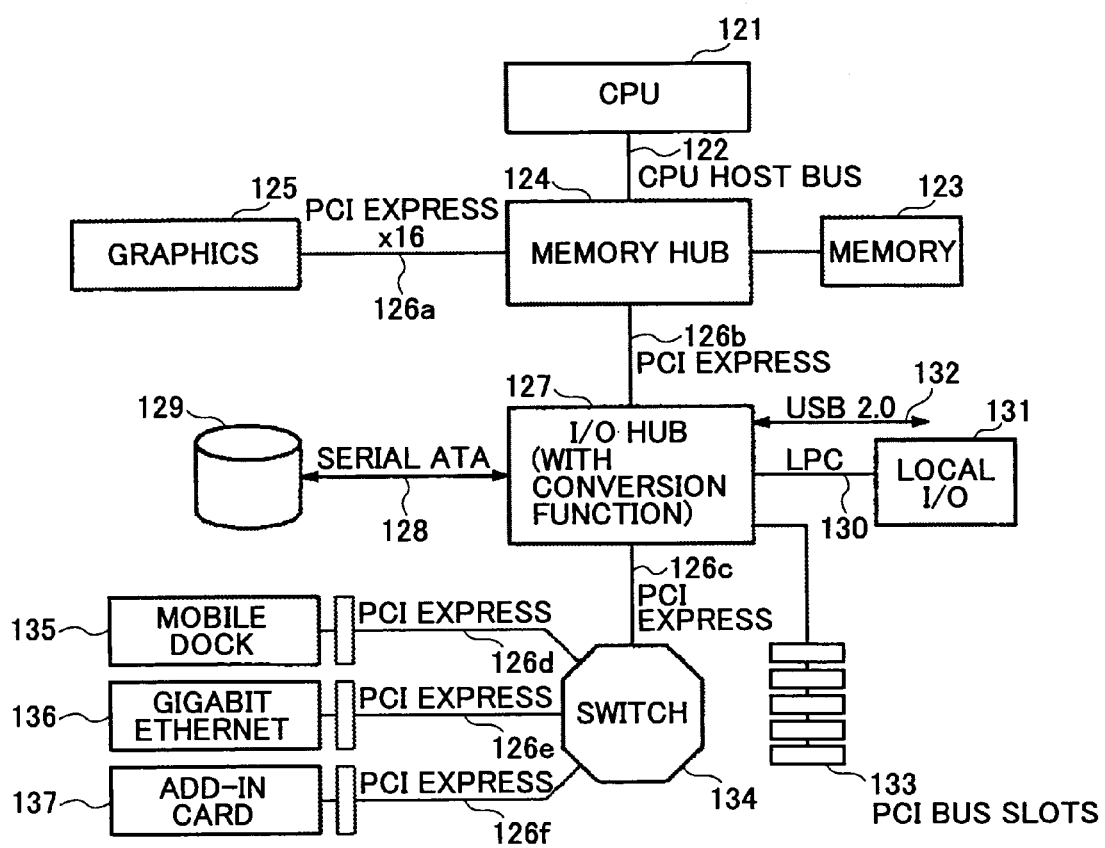
FIG. 3 is a block diagram showing a structure of a desktop/mobile platform implementing the PCI Express.

FIG. 3 is a block diagram showing an exemplary structure of a PCI Express platform that may be used in practice. The illustrated example of FIG. 3 may be used in a desktop/mobile application, for example. In the PCI Express system of FIG. 3, a CPU 121 is connected via a CPU host bus 122 to a memory hub 124 (corresponding to a root complex), which is connected to a memory 123. The memory hub 124 is connected to a graphics unit 125 via a x16 PCI Express link 126a, and/or an I/O hub 127 having a conversion function via a PCI Express link 126b, for example. The I/O hub 127 is connected to a storage 129 via a Serial ATA 128, a local I/O 131 via a LPC 130, a USB 2.0 132, and PCI bus slots 133, for example. Also, the I/O hub 127 is connected to a switch 134 via a PCI Express link 126c, and the switch 134 is connected to a mobile dock 135, a gigabit Ethernet (registered trademark) LAN 136, and an add-in card 137 via PCI Express links 126d, 126e, and 126f, respectively.

It is noted that in a PCI Express system, interfaces such as PCI, PCI-X, and AGP used in the PCI system are replaced by the PCI Express, and a bridge is used to establish connection between PCI/PCI-X devices. Connection between chip sets is also realized through PCI Express connection, and buses such as IEEE 1394, Serial ATA, and USB 2.0 are connected to the PCI Express via I/O hubs.

[Elements of the PCI Express]

A. Port/Lane/Link

Figure 4:
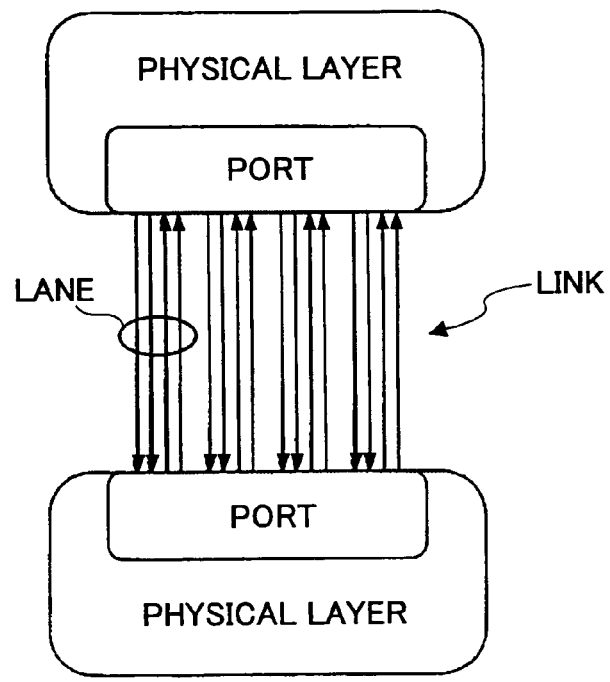
FIG. 4 is a diagram showing a structure of a physical layer of a x4 PCI Express link.

FIG. 4 is a diagram showing an exemplary physical layer structure of the PCI Express link. Referring to FIG. 4, a port corresponds to a set of transmitters and receivers that are physically provided within the same semiconductor for establishing a link, the port realizing an interface for logically establishing one-to-one connection (point-to-point connection) between components. In the present example, the transmission rate is assumed to be 2.5 Gbps per direction (a transmission rate of 5 Gbps or 10 Gbps is expected to be realized in future applications). A lane corresponds to a set of 0.8 V differential signal pairs, including a transmission signal pair and a reception signal pair, for example. A link corresponds to a set of lanes establishing connection between two ports, and realizes a dual simplex communication bus between components. It is noted that a xN link is made up of N lanes, and in the present standard, the number N is defined as N=1, 2, 4, 8, 16, or 32. The illustrated example of FIG. 4 corresponds to a x4 link.

Figure 5:
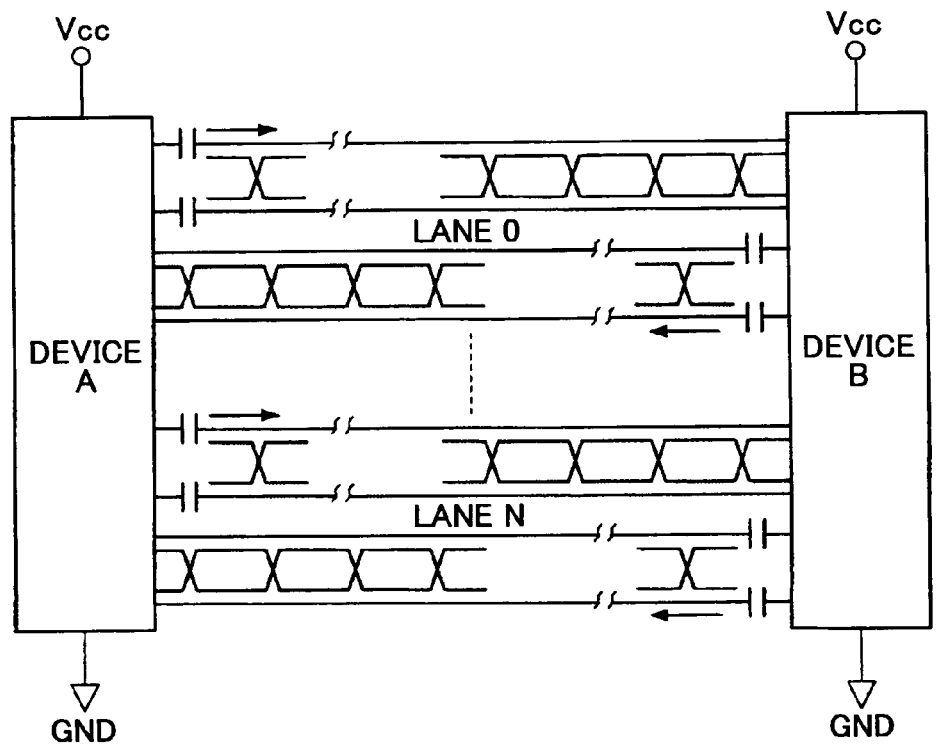
FIG. 5 is a diagram showing an exemplary lane connection between devices.

FIG. 5 is a diagram illustrating an exemplary arrangement of lanes establishing connection between device A and device B. By arranging the number of lanes N of the links to be adjustable, scalable bandwidth may be obtained.

B. Root Complex

Referring back to FIGS. 2 and 3, the root complex 112, which is often referred to as a memory hub (e.g., memory hub 124 of FIG. 3) is arranged at an uppermost position of an I/O structure, and is configured to connect units such as a CPU and a memory subsystem to the I/O structure. The root complex 112 (or memory hub 124) includes at least one PCI Express port (root port) (e.g., represented by small rectangles indicated within the root complex 112 in FIG. 2) that is configured to realize an independent I/O layer domain. The I/O layer domain may correspond to a simple end point (e.g., end point 115a of FIG. 2), or be made up of plural switches and end points (e.g., end point 115b and switches 117b and 117c of FIG. 2).

C. End Point

An end point 115 corresponds to a device having a type 00h configuration space header (i.e., a device other than a bridge device). Specifically, an end point may correspond to a legacy end point or a PCI Express end point. A primary difference between the two types of end points lies in the fact that the PCI Express end point corresponds to a BAR (base address register) that basically does not require an I/O port resource and thereby does not issue an I/O request. Also, it is noted that the PCI Express end point does not support a lock request.

D. Switch

Figure 6:
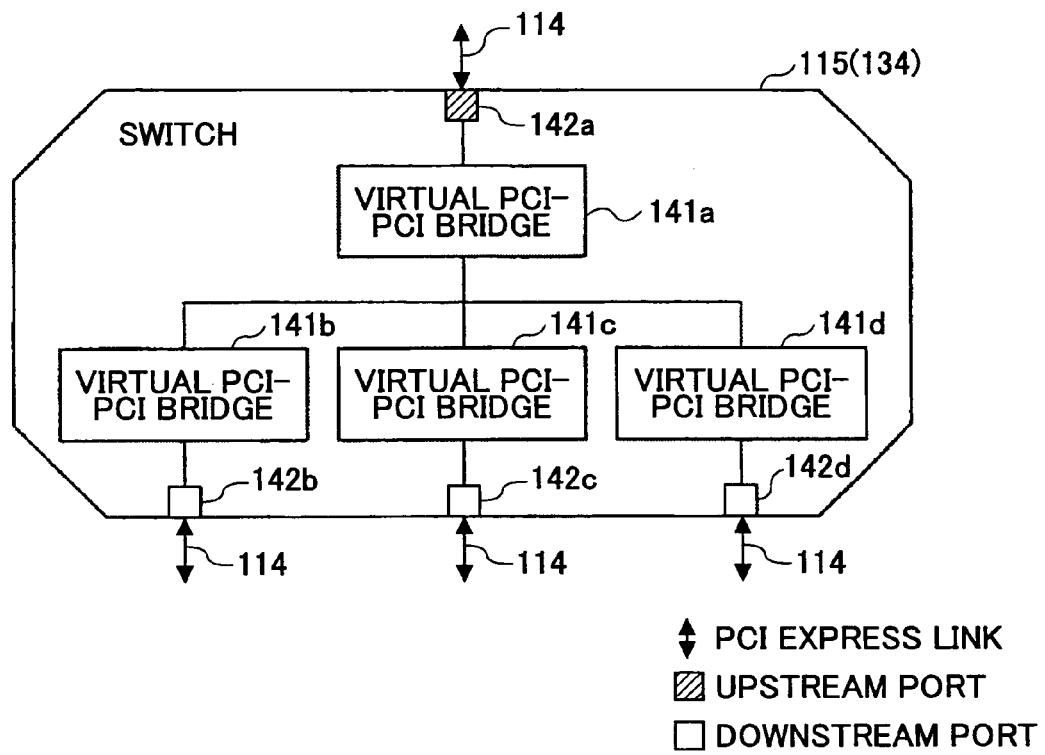
FIG. 6 is a block diagram showing a logical structure of a switch.

A switch (e.g., switches 117a~117c of FIG. 2 or switch 134 of FIG. 3) is configured to connect at least two ports, and conduct packet routing between the connected ports. As is illustrated in FIG. 6, according to configuration software, the switch is perceived as a collection of virtual PCI-PCI bridges 141. It is noted that in FIG. 6, PCI Express links 114 (or PCI express links 126) are represented by arrows, and ports 142a~142d are represented by square boxes. The port 142a corresponds to an upstream port that is positioned closer to the root complex, and ports 142b~142d correspond to downstream ports that are positioned further away from the root complex.

E. PCI Express-PCI Bridge

In a PCI Express system, connection between the PCI Express and PCI/PCI-X devices are provided. In this way, PCI/PCI-X devices of a PCI system may be used in the PCI Express system.

[Layer Architecture]

Figures 7A, 7B:
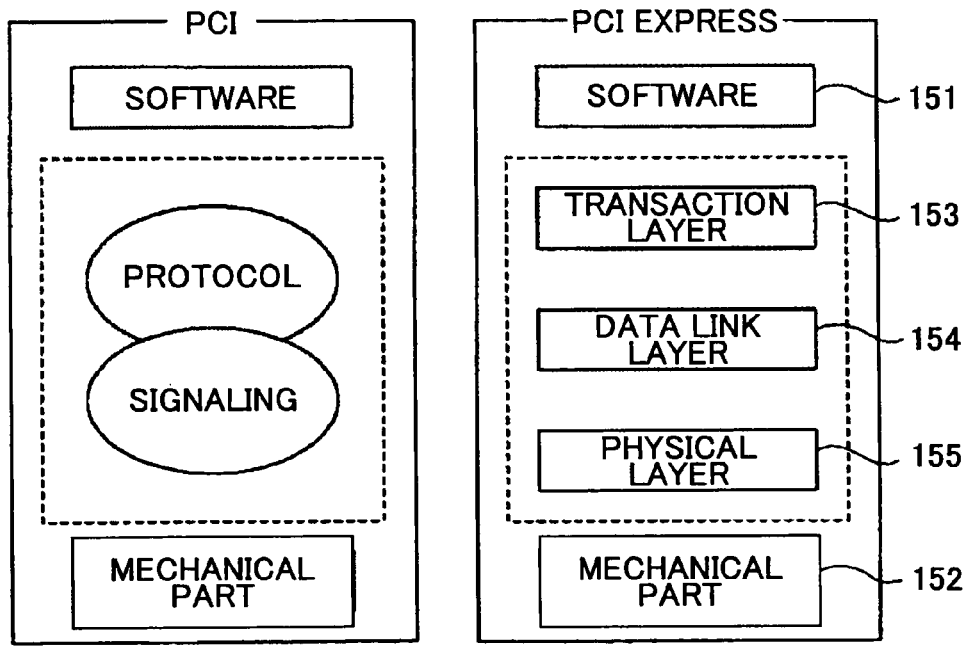
FIG. 7A is a block diagram illustrating a PCI architecture.
FIG. 7B is a block diagram illustrating a PCI Express architecture.

FIG. 7A shows a structure of PCI architecture, and FIG. 7B shows a structure of PCI Express architecture. As is shown in FIG. 7A, in the PCI architecture, protocol and signaling are intimately associated with each other, but the concept of a layer structure is not incorporated into the PCI architecture. As is shown in FIG. 7B, the PCI Express architecture has a layer structure similar to that of a general communication protocol or the InfiniBand and includes independent layers each defining their individual specifications. Specifically, the PCI Express architecture of FIG. 7B includes software 151 as an uppermost layer, a mechanical part 152 as a lowermost layer, and a transaction layer 153, a data link layer 154, and a physical layer 155 provided in between the uppermost and lowermost layers. In this way, modularity of the respective layers may be secured to thereby provide scalability and enable reuse of modules. For example, upon incorporating a new signal coding method or a transmission medium, only the physical layer may have to be changed, whereas the data link layer and the transaction layer may continue to be used without adding changes thereto.

In the following, functions of the transaction layer 153, the data link layer 154, and the physical layer 155 of the PCI Express architecture are described with reference to FIG. 8.

A. Transaction Layer 153

Figure 9:
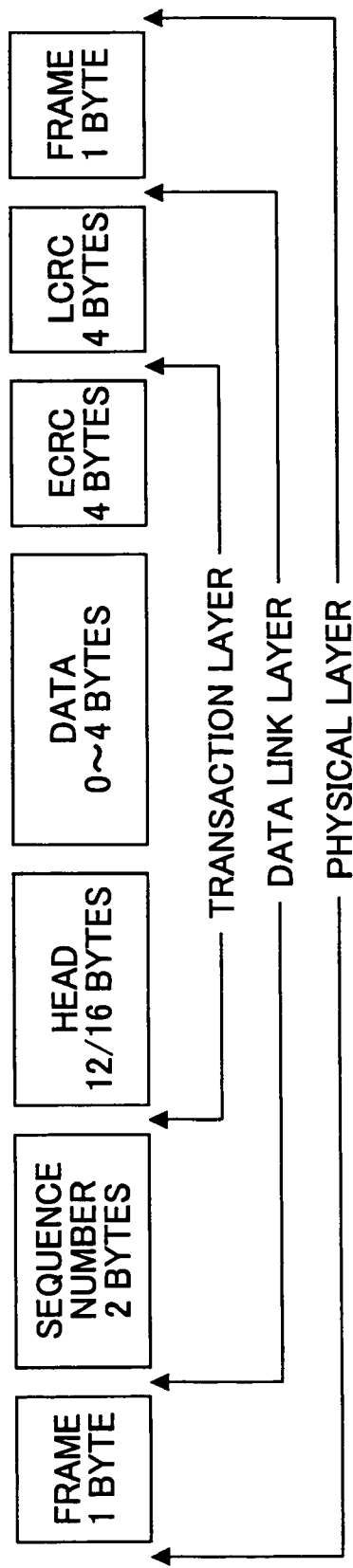
FIG. 9 is a diagram illustrating an exemplary format of a transaction layer packet.

The transaction layer 153 corresponds to the uppermost layer of the three layers and is provided with functions for constructing and deconstructing a transaction layer packet (TLP). The transaction layer packet (TLP) is used for transmitting various transactions such as read/write transactions and other events. The transaction layer 153 conducts flow control using credits for the transaction layer packet (TLP). FIG. 9 is a diagram illustrating an exemplary format of a transaction packet layer (TPL) within the respective layers 153~155, the details of which are described below.

B. Data Link Layer 154

The data link layer 154 is provided with functions for ensuring data completeness of the transaction layer packet (TLP) through error detection/correction (retransmission) and realizing link management. In the data link layer 154, packet exchange is conducted for realizing link management and flow control. It is noted that the packet used in the data link layer 154 is referred to as a data link layer packet (DLLP) to distinguish such a packet from the transaction layer packet (TLP).

C. Physical Layer 155

The physical layer 155 includes circuits required for conducting interface operations such as a driver, an input buffer, a parallel-serial/serial-parallel converter, a PLL, and an impedance matching circuit, for example. The physical layer 155 is provided with interface initialization and protection functions as logical functions. Also, the physical layer 155 has a function of dissociating the data link layer 154 and the transaction layer 153 from the signal technology used in an actual link.

It is noted that in the hardware configuration of the PCI Express, the so-called embedded clock technology is used in which a clock signal is not used, and clock timing is embedded in a data signal so that the clock timing may be extracted at a reception side based on cross points in the data signal.

[Configuration Space]

Figure 10:
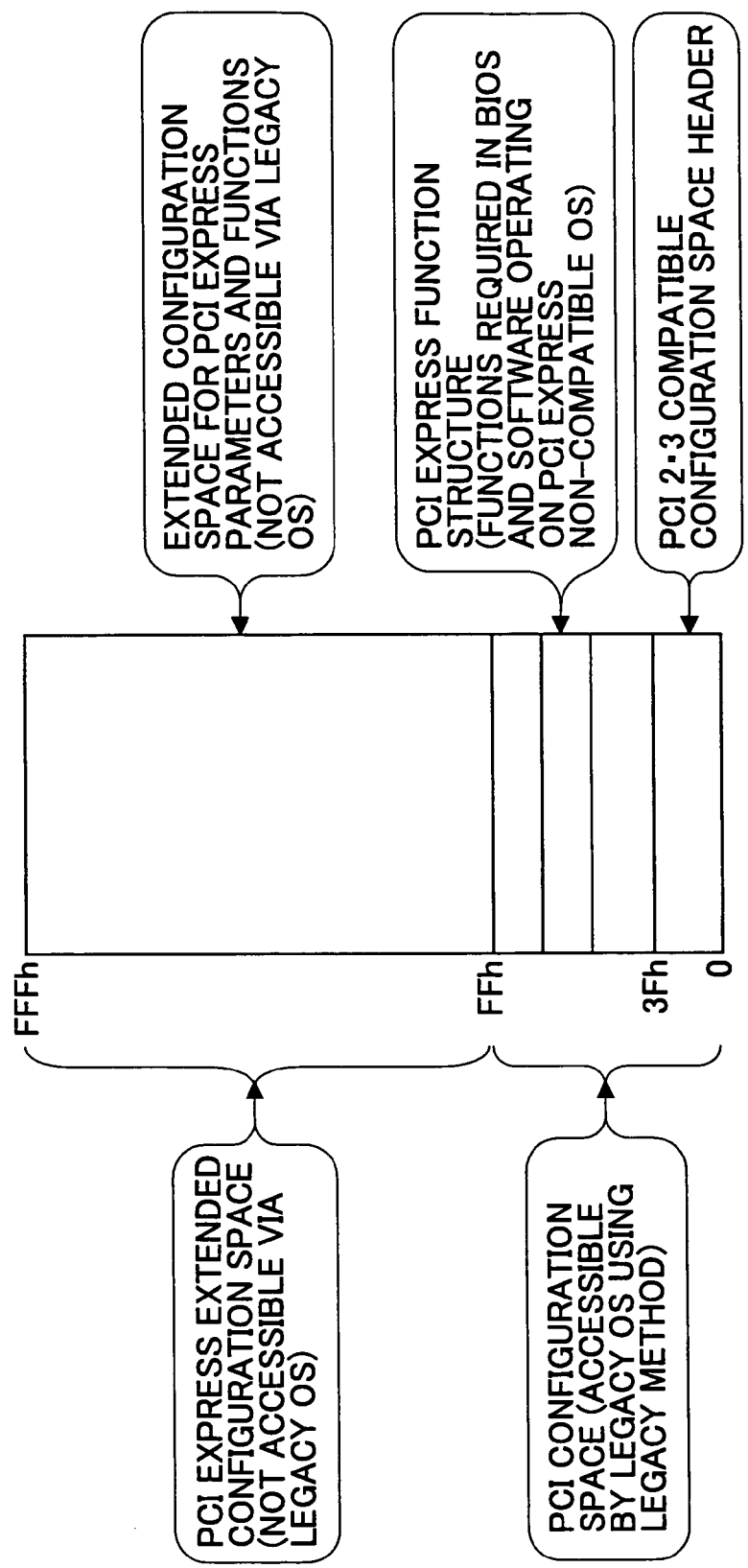
FIG. 10 is a diagram illustrating a configuration of storage space of the PCI Express.

The PCI Express includes a configuration of storage space as with the PCI. The size of the configuration space of the PCI Express is arranged to be larger than that of the PCI. Specifically, as is shown in FIG. 10, the PCI Express configuration space is extended to 4096 bytes from the 256 bytes used in the PCI. In this way, sufficient space may be secured for additional functions and devices (e.g., host bridge) requiring a large number of device specific register sets. It is noted that in the PCI Express, access to the configuration space is realized through access to a flat memory space (configuration read/write), and bus/device/function/register numbers are mapped in a memory address.

In the PCI Express configuration space, the first 256 bytes may be accessed as a PCI configuration space through the BIOS or from an OS using an I/O port, for example. Accordingly, a function of converting the access to the PCI into an access to the PCI Express is implemented in a host bridge. As is shown in FIG. 10, a PCI 2.3 compatible configuration space header is provided from 00h to 3Fh. In this way, a legacy OS or software that is originally implemented may be used for accessing functions other than the functions extended by the PCI Express. Specifically, in the software layer of the PCI Express, compatibility with the PCI load-store architecture (i.e., a scheme in which a processor directly accesses an I/O register) is maintained. However, in the case of using a function extended by the PCI Express (e.g., synchronous transmission, RAS (Reliability, Availability, and Serviceability)), access has to be made to the 4 KB PCI Express extended configuration space.

It is noted that various form factors may be conceived for the PCI Express including the add-in card, the plug-in card (NewCard), and the Mini PCI Express card, for example.

[Architecture of the PCI Express]

In the following, detailed descriptions of the transaction layer 153, the data link layer 154, and the physical layer 155 of the PCI Express architecture are given.

A. Transaction Layer 153

As is described above, the transaction layer 153 is provided with functions for constructing and deconstructing a transaction layer packet (TLP) exchanged between the upper software layer 151 and the lower data link layer 154.

(a) Address Space and Transaction Type

In the PCI Express, four address spaces are defined including a memory space (for data transmission with a memory space), an I/O space (for data transmission with the I/O space), and a configuration space (for setup with a device configuration) that are also defined in the PCI; and a message space (for in-band event notification or general message transmission (exchange) between PCI Express devices, the message space allowing interrupting requests or confirmations to be transmitted as virtual wire messages) that is additionally defined in the PCI Express. It is noted that transaction types are defined by the respective address spaces (i.e., read/write transactions are defined by the memory space, the I/O space, and the configuration space, and message transactions including vendor message transactions are defined by the message space).

(b) Transaction Layer Packet (TLP)

The PCI Express realizes communication in packet units. Referring to the transmission layer packet (TLP) format shown in FIG. 9, a header having a length of 3 DW (12 bytes) or 4 DW (16 bytes) (DW: double word) is provided, the header including information on the format of the transaction layer packet (e.g., header length, the presence of a payload), the transaction type, the traffic class (TC), attributes, and the payload length, for example. It is noted that the maximum payload length within the packet is 1024 DW (4096 bytes).

The ECRC (End-to-end Cyclic Redundancy Checksum) is provided for ensuring end-to-end data completeness, and corresponds to a 32-bit CRC of the transaction layer packet. It is noted that when an error occurs at the transaction layer packet (TLP) within the switch, such an error may not be detected in the LCRC (link CRC) since the LCRC is recalculated at the TLP.

It is noted that a request may or may not require a complete packet.

(c) Traffic Class (TC) and Virtual Channel (VC)

Traffic class (TC) information may be used by the upper software layer to distinguish (prioritize) traffic. For example, transmission of graphic data may be prioritized over network data. It is noted that eight traffic classes TC0~TC7 are provided.

Figure 11:
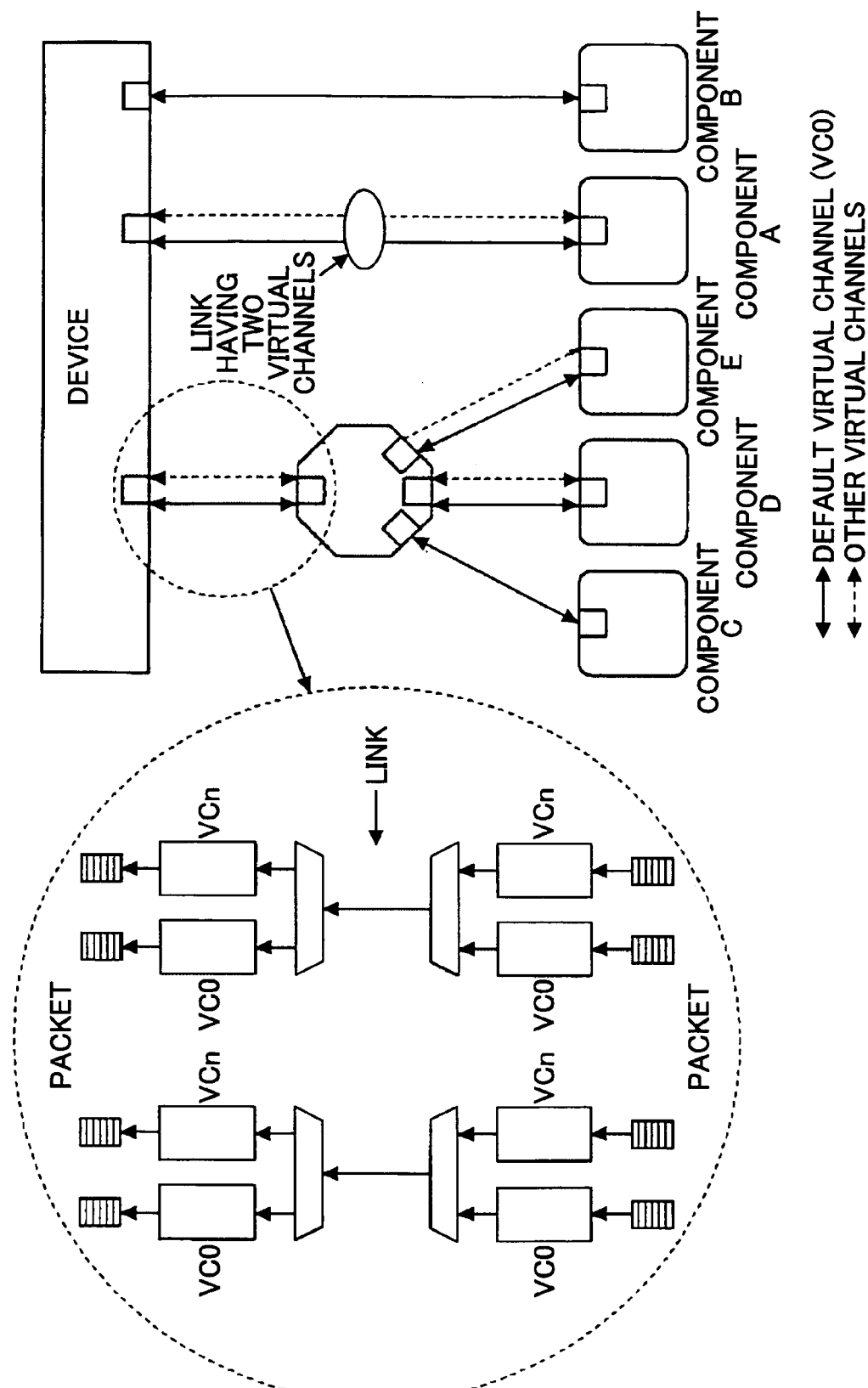
FIG. 11 is a diagram illustrating the concept of a virtual channel.

Virtual channels (VC) correspond to virtual communication buses (mechanism using plural independent data flow buffers sharing the same link) that each have resources (e.g., buffers or queues) and are arranged to conduct independent flow control operations as is illustrated in FIG. 11, for example. In this way, even when a buffer of one virtual channel is full, data transmission may be conducted using another virtual channel. In other words, by dividing one physical link into plural virtual channels, efficient use of resources may be realized. For example, as is shown in FIG. 11, when the link of a root branches out to plural devices via a switch, traffic priority for each of the devices may be controlled. It is noted that the virtual channel VC0 corresponds to a default virtual channel that is required in the system, and other virtual channels (e.g., VC1~VC7) may be provided according to tradeoff between cost and performance. In FIG. 11, the default virtual channel VC0 is indicated by solid lines, and other virtual channels (e.g., VC1~VC7) are indicated by broken lines.

In the transaction layer 153, the traffic classes (TC) are mapped to the virtual channel(s) (VC). It is noted that one or more traffic classes (TC) may be mapped to a virtual channel according to the number of virtual channels being provided. As two simple examples, each traffic class (TC0~TC7) may be mapped to each virtual channel (VC0~VC7) on a one-to-one basis, or all the traffic classes (TC0~TC7) may be mapped to a single virtual channel (VC0). It is noted that the mapping of TC0 to the virtual channel VC0 is a prerequisite, whereas the mapping of the other traffic classes (TC1~TC7) may be controlled by the upper software layer. As is described above, the software layer may use the traffic class (TC) information to control the priority of transactions.

(d) Flow Control

It is noted that flow control (FC) is conducted in order to avoid congestion and overflow of the reception buffer, and to set a transmission order. The flow control is conducted on a point-to-point basis between links rather than on an end-to-end basis. Therefore, it may not be confirmed through such flow control that a packet has actually been received at the communication counterpart (completer).

In the PCI Express, credit-based flow control is conducted. That is, the PCI Express implements a mechanism for preventing overflow or underflow by checking the state of the buffer at the reception side before starting data transmission. More specifically, at the time of link initialization, the reception side informs the transmission side of its buffer capacity (credit value). In turn, the transmission side compares the credit value with the length of the packet it intends to send to the receiving side, and conducts the packet transmission only when the credit value exceeds the transmission packet length by a predetermined value. It is noted that six types of credits are provided.

Information exchange with respect to flow control is realized using the data link layer packet (DLLP) of the data link layer 154. It is noted that the flow control is only conducted on the transaction layer packet (TLP) so that the data link layer packet (DLLP) may be transmitted at all times (i.e., the data link layer packet is not subject to flow control).

B. Data Link Layer 154

As is described above, the data link layer 154 is provided with functions for realizing highly reliable exchange of the transaction layer packets (TLP) between two components provided over a link.

(a) Handling of the Transaction Layer Packet (TLP)

Referring to FIG. 9, at the data link layer 154, a 2-byte sequence number and a 4-byte link CRC (LCRC) are respectively attached to the front end and rear end of a transaction layer packet (TLP) received from the transaction layer 153, after which the packet is handed to the physical layer 155. The transaction layer packet (TLP) is stored in a retry buffer until reception confirmation (ACK) is received from the reception side. When the transmission of the transaction layer packet successively fails, it may be determined that there is a link abnormality, and a link retraining request may be sent to the physical layer 155. When link training failure is detected, the data link layer 154 is switched to an inactive state.

On the other hand, with respect to a transmission layer packet (TLP) received from the physical layer 155, the sequence number and the link CRC (LCRC) of the transaction layer packet (TLP) from the physical layer 155 are evaluated at the data link layer 154, and the transaction layer packet (TLP) is handed to the transaction layer 153 if no abnormalities are detected. If an error is detected, a retransmission request is sent to the physical layer 155.

(b) Data Link Layer Packet (DLLP)

A packet generated by the data link layer 154 is referred to as a data link layer packet (DLLP) and is exchanged within the data link layer 154. It is noted that the following types of data link layer packets (DLLP) are provided:

Ack/Nak DLLP: for TLP reception confirmation/retry (retransmission)

InitFC1/InitFC2/UpdateFC DLLP: for flow control initialization and updating

DLLP for power management

Figure 12:
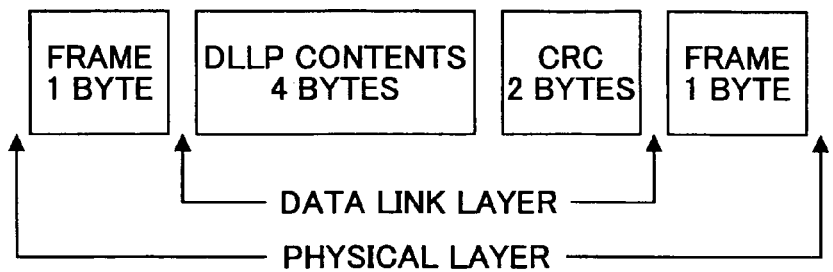
FIG. 12 is a diagram illustrating an exemplary format of a data link layer packet.

FIG. 12 is a diagram showing an exemplary format of a data link layer packet (DLLP). As is shown in this drawing, the data link layer packet has a packet length of 6 bytes, and includes information indicating the type of DLLP (1 byte), unique information in conjunction with the type of DLLP (3 bytes), and CRC (2 bytes).

C. Physical Layer-Logical Sub Block 156

Figure 8:
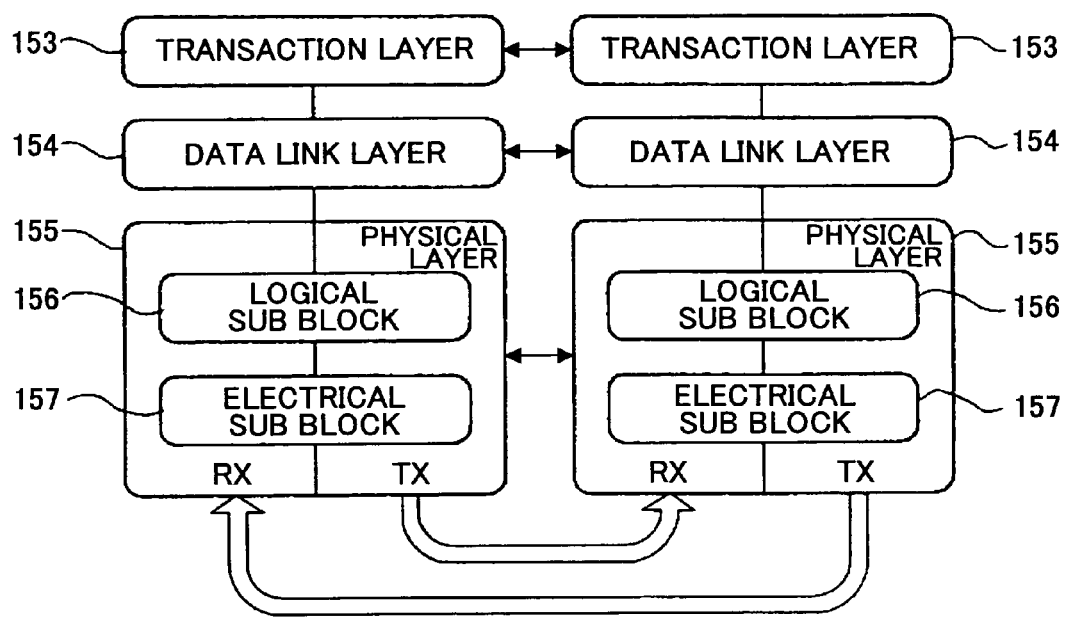
FIG. 8 is a block diagram showing a layer structure of the PCI Express.

Referring to FIG. 8, the physical layer 155 includes a logical sub block 156. The primary task of the logical sub block 156 of the physical layer 155 is to convert a packet received from the data link layer 154 into a format suited for transmission by an electrical sub block 157. Also, the logical sub block 156 has the function of controlling and managing the physical layer 155.

(a) Data Coding and Parallel-to-Serial Conversion

Figure 13:
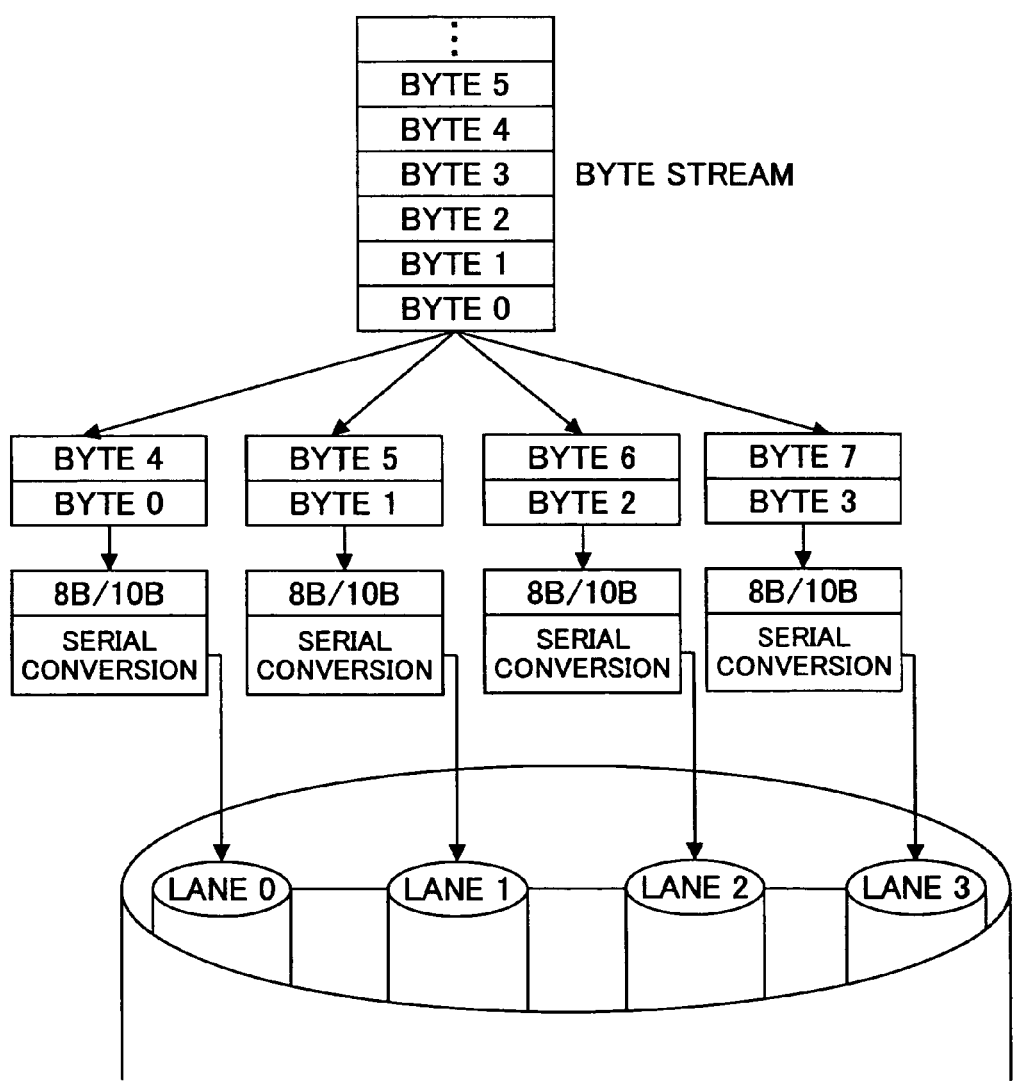
FIG. 13 is a diagram illustrating byte striping of data in the x4 PCI Express link.

The PCI Express uses 8B/10B conversion for data coding so that long successions of '0's and '1's do not occur (i.e., so that an absence of cross points does not last for a long period of time). FIG. 13 illustrates byte striping of data in a x4 link. As is illustrated in FIG. 13, the converted data are serially converted to be transmitted from an LSB onto a lane. In a case where plural lanes are provided (e.g., FIG. 13 illustrates a x4 link), data are assigned to the respective lanes in byte units before being encoded. It is noted that the illustrated example appears to correspond to a parallel bus transmission; however, an independent transmission is realized in each of the lanes so that problems such as skews created in the parallel bus may be alleviated.

(b) Power Management and Link State

As is shown in FIG. 14, link states L0, L0s, L1, and L2 are defined for reducing the link power consumption.

According to FIG. 14, the link state L0 corresponds to a normal mode, and the link states L0s through L2 correspond to reduced power consumption modes in different degrees. It is noted that more recovery time is required for recovering back to normal mode (L0) as the degree of reduction in power consumption is increased. Also, it is noted that the recovery time from the link state L2 to the link state L0 may depend on factors such as the rise time of a power source or a PLL in the system, for example.

Figure 15:
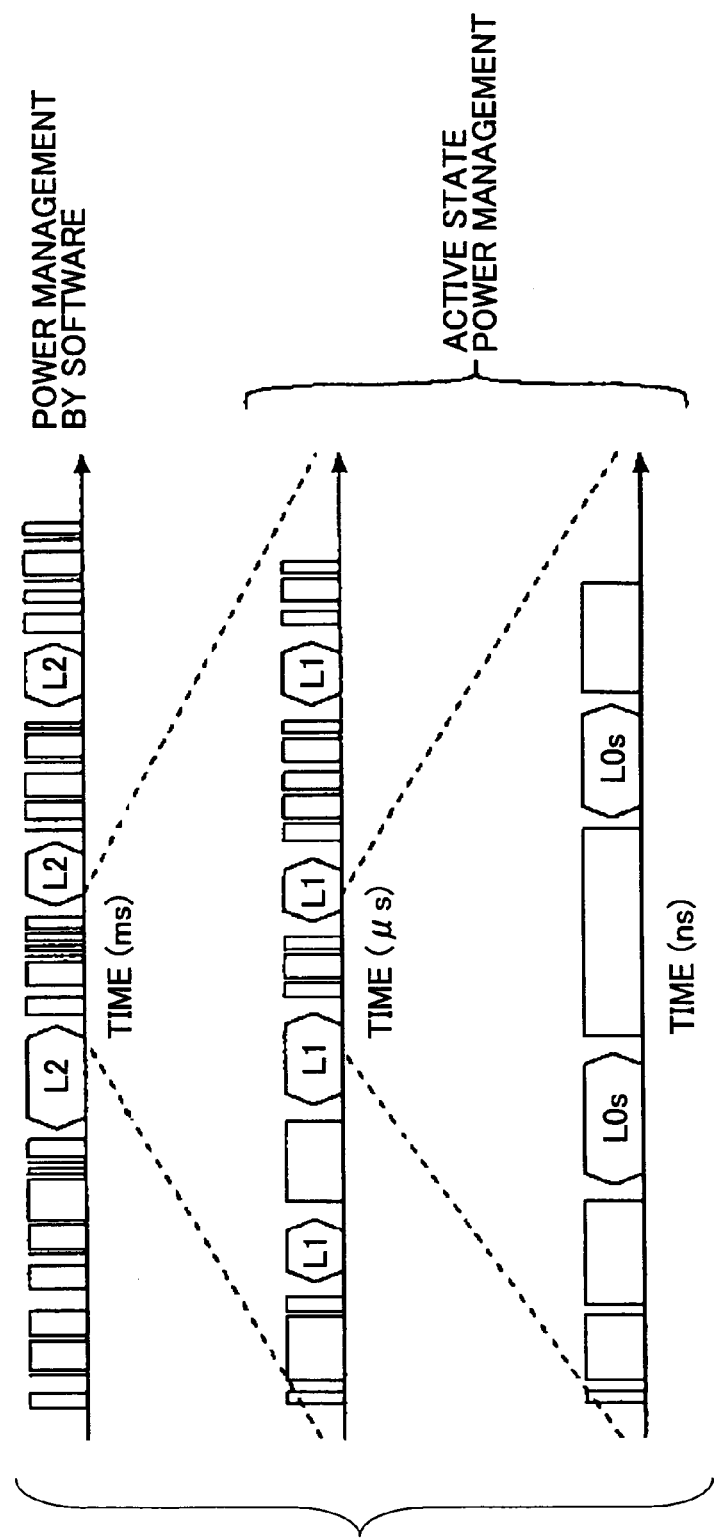
FIG. 15 is a timing chart illustrating active state power management of the PCI Express link.

Also, as is shown in FIG. 15, power consumption may be reduced by conducting active state power management in addition to power management by software.

D. Physical Layer-Electrical Sub Block 157

As is shown in FIG. 8, the physical layer 155 includes an electrical sub block 157. The primary tasks of the electrical sub block 157 are to transmit data serially converted by the logical sub block 156 to a lane, and receive data from a lane to hand the data to the logical sub block 156.

(a) AC Coupling

It is noted that an AC coupling condenser is provided at the transmission side of a link. In this way, the DC common mode voltages of the transmission side and the reception side do not necessarily have to be the same. Thereby, differing structures, semiconductor processes, and power voltages may be used at the transmission side and the reception side.

(b) De-Emphasis

As is described above, in the PCI Express, 8B/10B encoding is conducted in order to reduce successive occurrences of '0's and '1's. However, successions of '0's or '1's may still occur (e.g., five times at the maximum). In such case, the transmission side conducts de-emphasis transmission. When bits of the same polarity occur in succession, the differential voltage level (amplitude) is decreased by 3.5±0.5 dB for the second bit and onward in the succession in order to secure the noise margin of the signal being received at the reception side. Such a process is referred to as de-emphasis. Owing to the frequency dependency attenuation of the transmission channel, when a bit is different from the previous bit, a large amount of high frequency components occur, and the waveform received at the reception side is reduced in size due to the attenuation. On the other hand, when a bit is not different from the previous bit, high frequency components are reduced, and a relatively larger waveform is received at the reception side. Accordingly, de-emphasis is conducted in order to maintain consistency in the waveform received at the reception side.

[Digital Copier]

In the following, a digital copier as one embodiment of the present invention is described.

Figure 16:
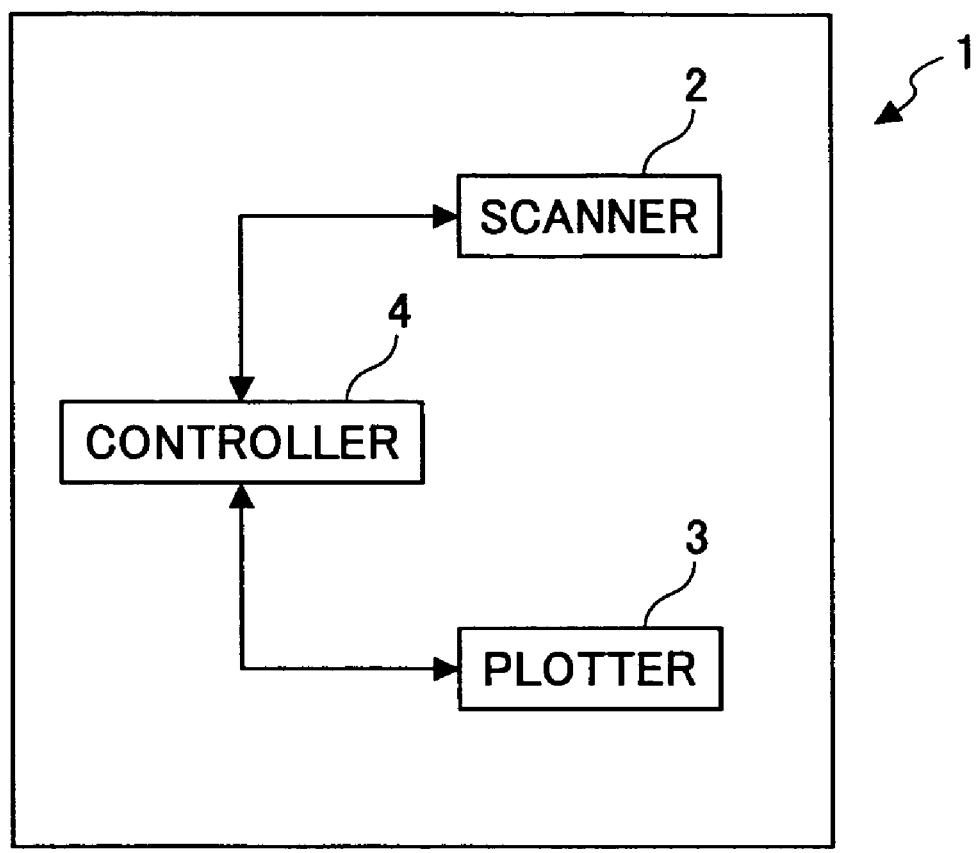
FIG. 16 is a block diagram illustrating a configuration of an imaging apparatus according to an embodiment of the present invention.

FIG. 16 is a block diagram showing a configuration of the digital copier according to one embodiment of the present invention. As is shown in this drawing, the digital copier 1 of the present embodiment includes a scanner 2 that scans an image of a document that is subject to processing, a plotter 3 that forms an image on a medium such as paper based on the image data of the scanned document, and a controller 4 that controls overall operations of the digital copier 1. It is noted that the plotter 3 may employ various printing methods such as electrophotographic printing, inkjet printing, dye sublimation thermal transfer printing, silver salt photographic printing, direct thermal printing, or thermal wax transfer printing, for example.

Figure 17:
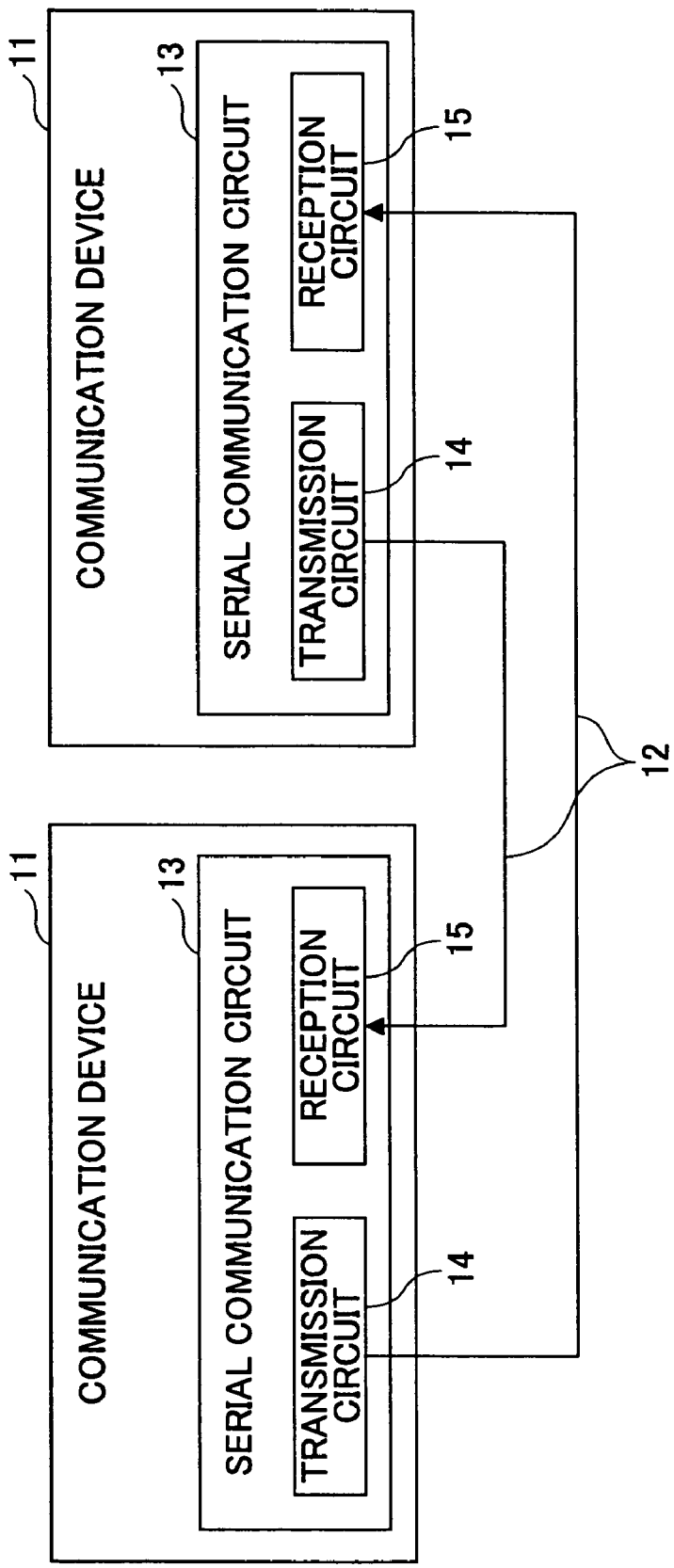
FIG. 17 is a block diagram illustrating a configuration of a communication device used in the imaging apparatus of the present embodiment.

According to the present embodiment, the scanner 2, the plotter 3, and the controller 4 each include a communication device 11 as is shown in FIG. 17, for example. The communication devices 11 of the scanner 2, the plotter 3, and the controller 4 are configured to establish communication with each other. It is noted that the communication device 11 is an embodiment of a communication apparatus according to the present invention, and is configured to communication with another communication device 11 as a communication counterpart.

The communication device 11 includes a serial communication circuit 13 that establishes communication via a serial communication line 12. The serial communication circuit 13 includes a transmission circuit 14 for transmitting data to the communication device 11 of a communication counterpart, and a reception circuit 15 for receiving data from the communication device 11 of the communication counterpart.

According to one embodiment, the communication device 11 conforms to the above-described PCI Express standard, and in this case, the controller 4 corresponds to the root complex while the scanner 2 and the plotter 3 correspond to the end points.

In the following detailed descriptions of the configuration of the communication device 11 are given.

Figure 18:
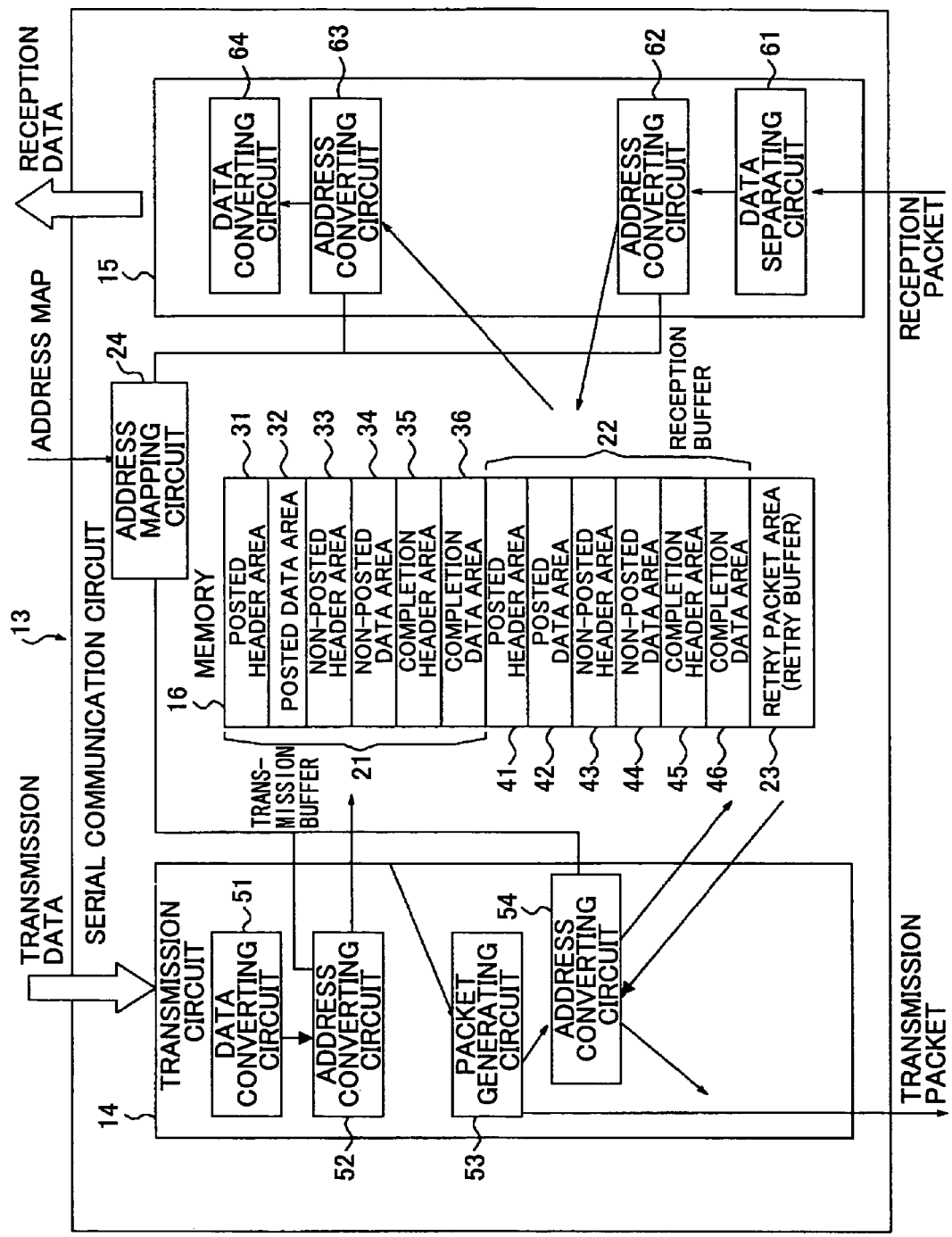
FIG. 18 is a block diagram illustrating an exemplary configuration of a serial communication circuit of the communication device of FIG. 17.

FIG. 18 is a block diagram showing an exemplary configuration of the serial communication circuit 13 of the communication device 11. In this example, the serial communication circuit 13 includes a memory 16 in addition to the transmission circuit 14 and the reception circuit 15.

The memory 16 corresponds to a storage device that is configured as a transmission buffer 21 that stores transmission data to be transmitted from the transmission circuit 14, a reception buffer 22 that stores reception data received at the reception circuit 15, and a retry buffer (retry packet area) 23.

The transmission buffer 21 includes a posted header area 31, a posted data area 32, a non-posted header area 33, a non-posted data area 34, a completion header area 35, and a completion data area 36. Similarly, the reception buffer 22 includes a posted header area 41, a posted data area 42, a non-posted header area 43, a non-posted data area 44, a completion header area 45, and a completion data area 46.

With respect to the above areas of the buffers (buffer areas), "posted" signifies that in sending a request to a counterpart, a response packet to the request is required from the counterpart; "non-posted" signifies that in sending a request to a counterpart, a response packet to the request is not required from the counterpart; and "completion" corresponds to the response packet for a non-posted request. Also, "header" refers to a portion including management information other than the data payload included in a packet, and "data" refers to a portion corresponding to the data payload included in a packet.

The posted header areas 31 and 41 correspond to areas for storing a posted header, the posted data areas 32 and 42 correspond to areas for storing posted data, the non-posted header areas 33 and 43 correspond to areas for storing a non-posted header, non-posted data areas 34 and 44 correspond to areas for storing non-posted data, completion header areas 35 and 45 correspond to areas for storing a completion header, and completion data areas 36 and 46 correspond to areas for storing completion data.

The retry buffer 23 is used for storing copy data of a transmission packet until receiving a transmission acknowledge packet for a transmission packet in order to enable retransmission of the transmission packet upon the occurrence of an error in image data transmission.

In the present example, the serial communication circuit 13 includes an address mapping circuit 24 that performs address mapping on the memory 16 to map out the transmission buffer 21, the reception buffer 22, the retry buffer 23, and the areas arranged within the respective buffers and divide the memory space of the memory 16 into the buffers and buffer areas. It is noted that the address mapping circuit 24 is capable of performing a new address mapping process to change the storage capacities of the respective buffers and buffer areas.

In the present example, the transmission circuit 14 includes a data converting circuit 51, an address converting circuit 52, a packet generating circuit 53, and an address converting circuit 54. The data converting circuit 51 is configured to convert transmission data into data suitable for transmission. In this way, the posted header, the posted data, the non-posted header, the non-posted data, the completion header, and the completion data are created.

The address converting circuit 52 performs address conversion involving setting the addresses of transmission data converted for transmission such that data sets of the converted transmission data are assigned to the respective areas of the transmission buffer 21. Specifically, the converted transmission data are stored in the respective areas 31-36 of the transmission buffer 21 according to their corresponding data types (i.e., posted header, posted data, non-posted header, non-posted data, completion header, or completion data).

The packet generating circuit 53 is configured to generate a packet from the data stored in the transmission buffer 21. The generated transmission packet is transmitted to the communication device 11 of a communication counterpart on one hand, and on the other hand, address conversion is performed on the generated transmission packet at the address converting circuit 54. The conversion performed at the address converting circuit 54 involves changing the address of the transmission packet to the retry buffer 23 so that the transmission packet may be temporarily stored in the retry buffer 23. It is noted that the retry buffer 23 temporarily stores the transmission packets in order to enable retransmission of the transmission packet in case the current packet transmission ends in failure.

The reception circuit 15 includes a data separating circuit 61, address converting circuits 62, 63, and a data converting circuit 64. The data separating circuit 61 is configured to separate a received packet into a posted header, posted data, a non-posted header, non-posted data, a completion header, and completion data.

The address converting circuit 62 is configured to perform an address conversion process on the separated data so that the separated data may be stored in the respective areas of the reception buffer 22 according to their corresponding data types.

The address converting circuit 63 is configured to perform a predetermined address conversion process on data stored in the reception buffer 22. The data converting circuit 64 is configured to perform a predetermined data conversion process on data stored in the reception buffer 22 to convert the data into a data format adapted for used in the scanner 2, the plotter 3, or the controller 4. In this way, the converted reception data may be received at a predetermined receiving end of the scanner 2, the plotter 3, or the controller 4.

According to one embodiment, the communication device 11 including the serial communication circuit 13 having the above-described configuration is provided in each of the scanner 2, the plotter 3, and the controller 4, and in this way, image data may be transmitted from the scanner 2 to the controller 4 through a Memory Write Transaction, and image data may be transmitted from the controller 4 to the plotter 3 through a Memory Read Transaction.

Also, according to one embodiment, the division of the memory space of the memory 16 into the respective buffers and buffer areas can be variously arranged by the address mapping circuit 24, and the address map for the division arrangement may be supplied to the address mapping circuit 24 from a CPU of the controller 4 corresponding to the root complex. In this case, the CPU of the controller 4 may correspond to a division determining unit.

In the following, specific examples of setting the division (size) of the buffers and the buffer areas within the memory 16 are described.

Figure 19:
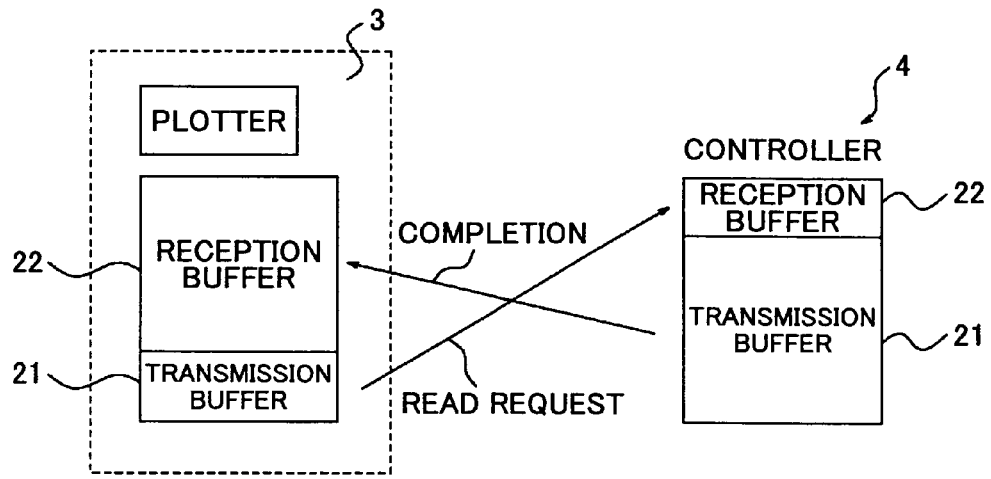
FIG. 19 is a diagram illustrating an exemplary setting of buffer sizes.

In one example, as is shown in FIG. 19, in a case where the plotter 3 issues a request to the controller 4 to transmit image data, the capacity of the transmission buffer 21 is arranged to be smaller than the capacity of the reception buffer 22 at the plotter 3 side, and the capacity of the reception buffer 22 is arranged to be smaller than the capacity of the transmission buffer 21 at the controller 4 side.

Specifically, in the case where the plotter 3 issues a request to the controller 4 to transmit image data, a read request (non-posted header) is transmitted from the plotter 3 to the controller 4, and completion (completion header and completion data) of image data is transmitted from the controller 4 to the plotter 3. In this case the data amount of the read request is relatively small whereas the data amount of the completion is relatively large since it includes image data. Accordingly, the division of the buffers as is described above is preferably applied in the present case.

Figure 20:
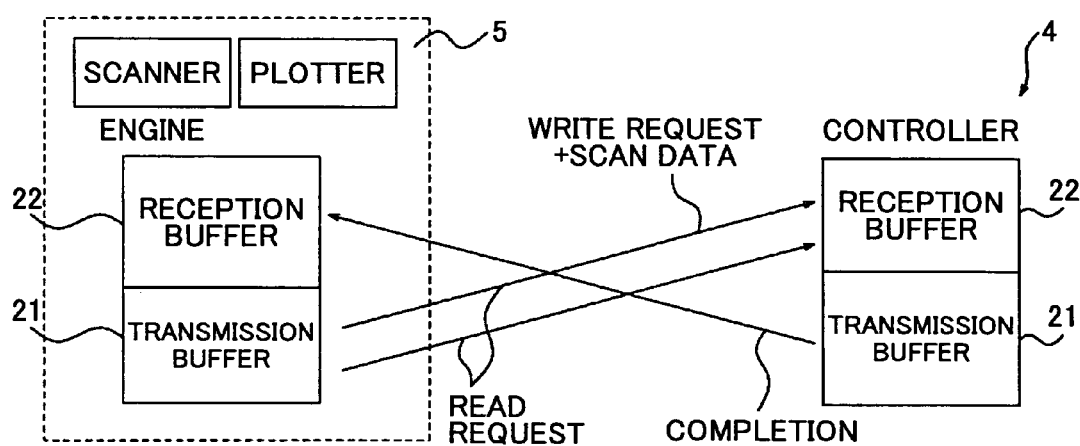
FIG. 20 is a diagram illustrating another exemplary setting of buffer sizes.

In another example, as is shown in FIG. 20, in a case where an engine 5 including the scanner 2 and the plotter 3 and a single communication device 11 establishes communication with the communication device 11 of the controller 4, and when transmission of a request for image data from the plotter 3 to the controller 4 and transmission of scan data from the scanner 2 to the controller 4 are performed simultaneously, the capacities of the transmission buffer 21 and the reception buffer 22 are preferably arranged to be substantially equal.

In this case, a read request as well as a write request (posted header, posted data) and the scan data obtained by the scanner 2 are transmitted from the communication device 11 at the engine side 5 to the controller 4. Since the data amount of the scan data is relatively large, the transmission buffer 21 at the engine 5 side and the reception buffer 22 at the controller 4 side are also preferably arranged to have relatively large capacities.

In other examples, the division of the memory 16 into the transmission buffer 21, the reception buffer 22, and the respective buffer areas thereof may be performed according to the line speed of the scanner 2 in the sub scanning direction, the line speed of the plotter 3 in the sub scanning direction, the image data amount or the resolution of the plotter 3 in the main scanning direction, the packet data size of the packet being transmitted upon image data transmission, or the frequency in which error occurs in image data transferring operations, for example.

Figure 21:
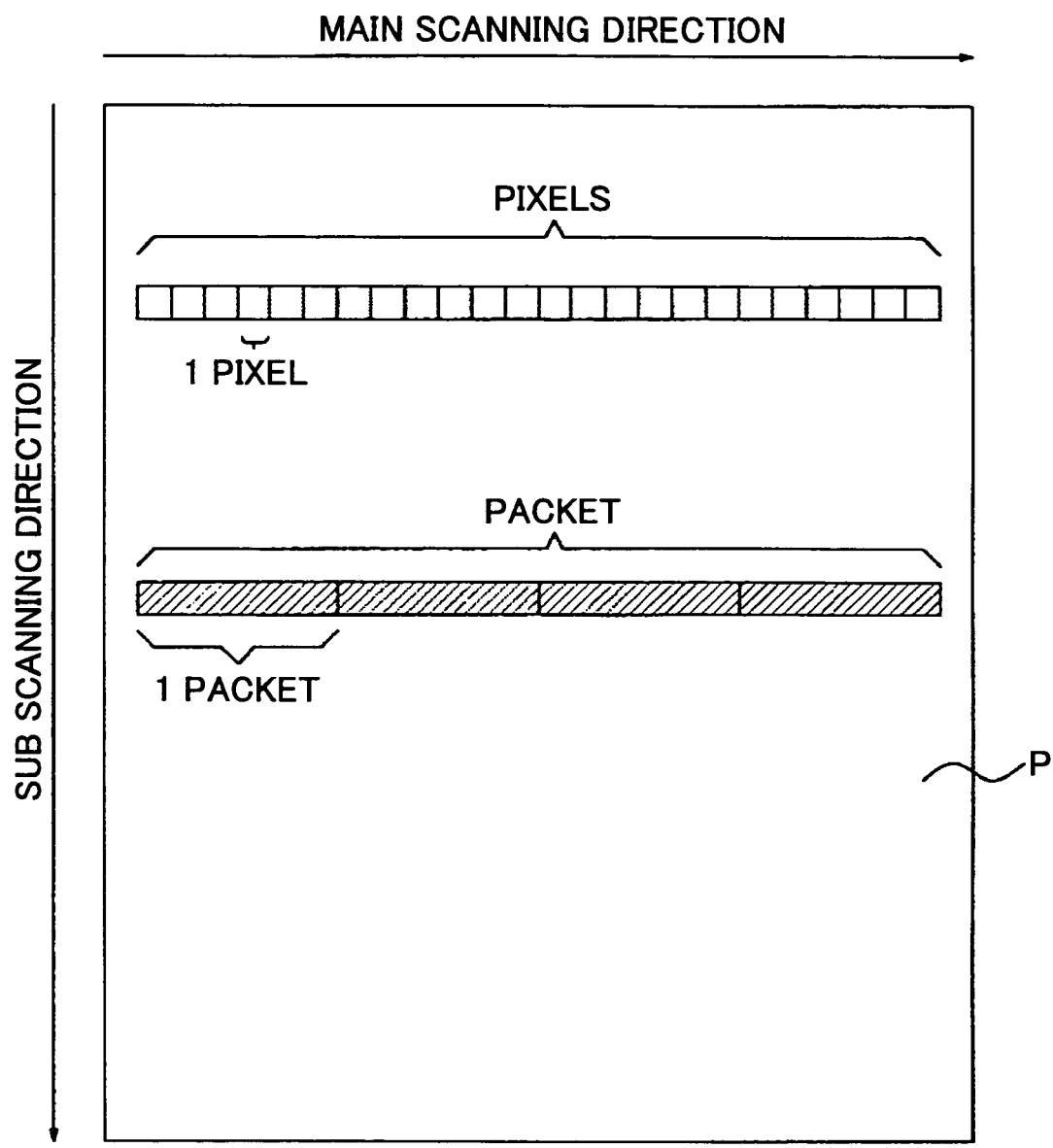
FIG. 21 is a diagram illustrating a structure of a packet in relation to pixels.

In this case, as is shown in FIG. 21, image data of plural pixels aligned in the main scanning direction on a document or paper P (on which the plotter 3 performs printing) are arranged into data of one packet of image data transmitted by the scanner 2 and received by the plotter 3 as transmission data and reception data.

Figure 22A:
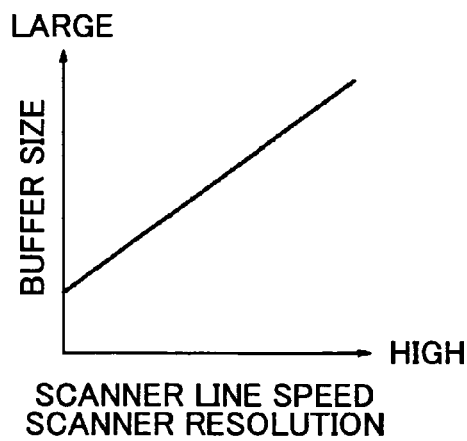
FIGS. 22A and 22B are graphs illustrating other exemplary settings of buffer sizes.

In one example, as is shown in FIG. 22A, the posted header area 31 and the posted data area 32 of the transmission buffer 21 of the scanner 2, and the posted header area 41 and the posted data area 42 of the reception buffer 22 of the controller 4 are arranged to become larger as the line speed or the image data amount of the scanner 2 is increased.

Figure 22B:
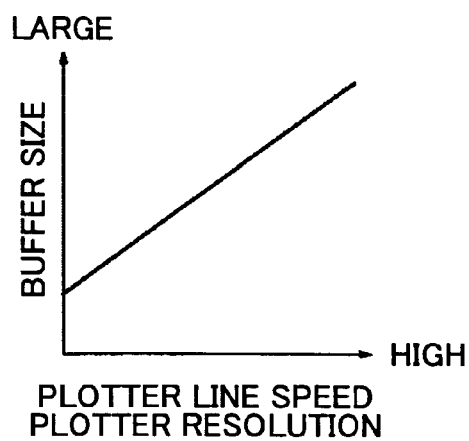

In another example, as is shown in FIG. 22B, the non-posted header area 33 of the transmission buffer 21 of the scanner 2; the non-posted header area 33, the completion header area 35, and the completion data area 36 of the transmission buffer 21 of the controller 4; and the completion header area 45 and the completion data area 46 of the reception buffer 22 of the scanner 2 are arranged to become larger as the line speed or the image data amount of the plotter 3 is increased.

Figure 23A:
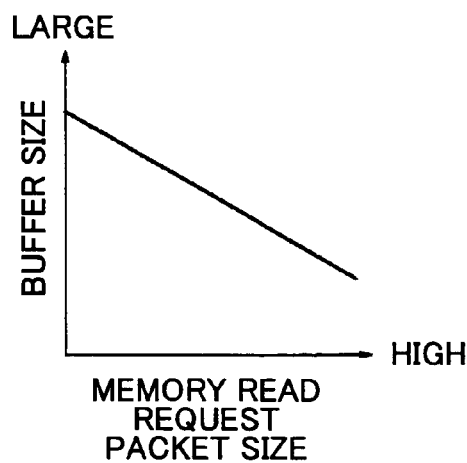
FIGS. 23A and 23B are graphs illustrating other exemplary settings of buffer sizes.

In another example, as is shown in FIG. 23A, the non-posted header area 33 of the transmission buffer 21 of the plotter 3 and the non-posted header area 33 of the transmission buffer 21 of the controller 4 are arranged to become larger as the size of packet data used for image data transmission by the controller 4 in response to a Memory Read Request from the plotter 3 becomes smaller.

Figure 23B:

In another example, as is shown in FIG. 23B, the size of the retry buffers 23 of the scanner 2, the plotter 3, and the controller 4 are arranged to become larger as the frequency of errors occurring upon transferring image data (error rate) is increased.

Figure 24:
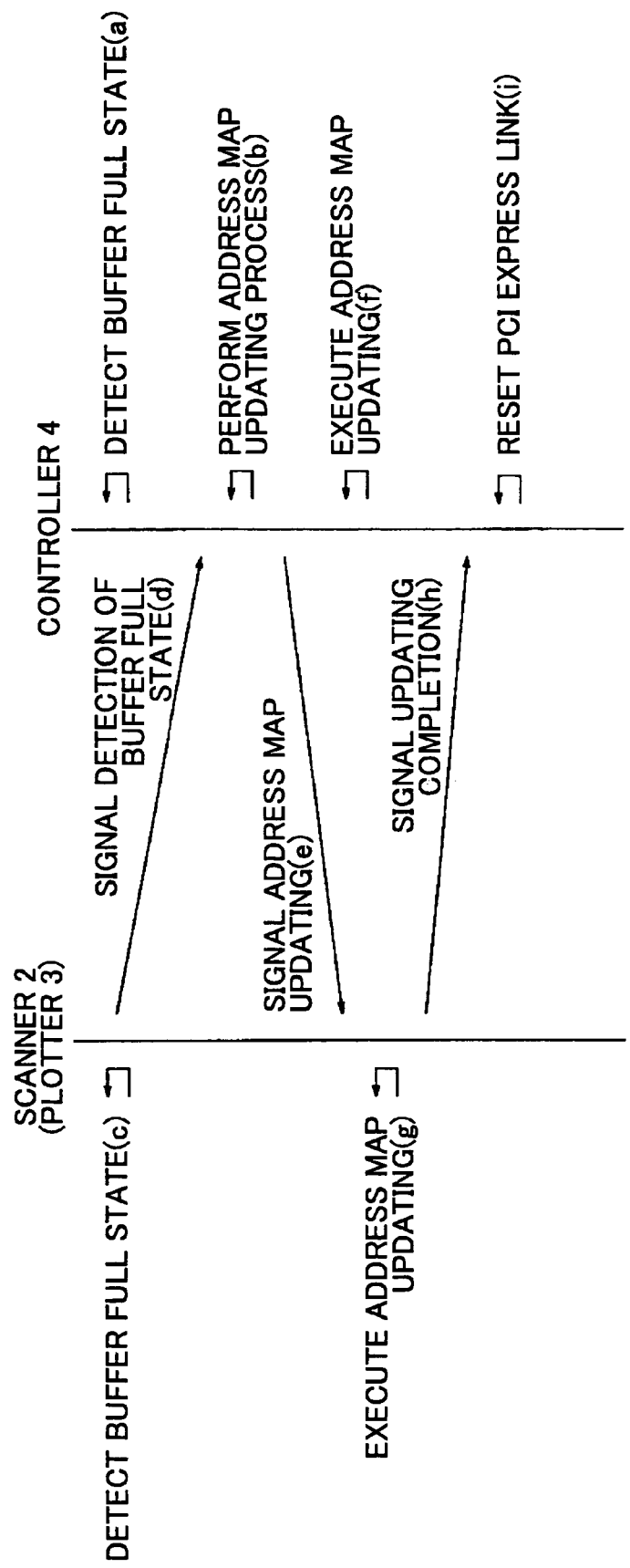
FIG. 24 is a sequence chart illustrating communications between a controller and a scanner (or plotter).

FIG. 24 is a communication sequence chart illustrating exemplary communications between the controller 4 and the scanner 2 (or plotter 3).

In the example of FIG. 24, buffer full states are detected at the buffers of the controller 4 and the scanner 2 (plotter 3), respectively. It is noted that the buffer full states may be detected through conventional means, and thereby, detailed descriptions thereof are omitted.

When a buffer full state is detected for at least one of the buffers of the controller 4 (a), the CPU of the controller 4 performs an address map updating (adjusting) process of updating the address map of the memory 16 of the controller 4 (b).

When a buffer full state is detected for at least one of the buffers of the scanner 2 (or plotter 3) (c), the controller 4 corresponding to the root complex is informed of such a detection by a message packet (d), and upon receiving this message packet, the CPU of the controller 4 performs an address map updating process of updating the address map of the memory 16 of the controller 4 (b).

In the updating process, the storage capacity may be increased in the buffer or buffer area for which the buffer full state has been detected, for example.

In another example, when buffer states are detected at plural buffers or buffer areas, the buffer full state occurring frequency for the respective buffers or buffer areas may be compiled (e.g., the number of times a buffer full state has occurred at each of the buffers over a predetermined time period in the past may be counted and the corresponding count data may be stored in a nonvolatile memory), and the buffer or buffer area with a higher buffer full state occurrence rate may be arranged to have its storage capacity increased at a higher rate.

When a buffer full state occurs in at least one of the buffers of the scanner 2 (or plotter 3) corresponding to the end point, the controller 4 corresponding to the root complex is informed of the occurrence of the buffer full state (d), and in turn, the CPU of the controller 4 executes an address map updating process of determining how to update the address map at the scanner 2 (or plotter 3) corresponding to the end point (b). Then, the controller signals the determined address map updating scheme to the scanner 2 (or plotter 3) corresponding to the end point (e).

In turn, the scanner 2 (or plotter 3) corresponding to the end point executes the updating of the address map of its memory 16 according to the information signal received from the controller 4 (g), and transmits an updating completion message packet to the controller upon completing the updating (h).

When a buffer full state occurs at the controller 4, address map updating is executed at the controller 4 (f).

When the controller 4 completes execution of the address map updating, and receives the updating completion message packet from the scanner 2 (or plotter 3), the controller 4 resets the link of the PCI Express (i).

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-008873 filed on Jan. 17, 2005, the entire contents of which are hereby incorporated by reference.

What is claimed is:

1. A communication apparatus, comprising:
a scanner configured to scan a document;
a plotter configured to form an image of the scanned document;
a transmission circuit configured to transmit transmission data to a communication counterpart coupled to a port;
a reception circuit configured to receive, via the port, reception data from the communication counterpart;
a storage device configured as at least two buffers including a transmission buffer that stores the transmission data transmitted to the communication counterpart via the port, and a reception buffer that stores the reception data received from the same communication counterpart via the same port;
an address mapping unit configured to perform address mapping of the at least two buffers including the transmission buffer and the reception buffer in the storage device, adjust a storage capacity of the transmission buffer and a storage capacity of the reception buffer, and divide each of the transmission buffer and the reception buffer into buffer areas; and
a division determining unit configured to determine a first division arrangement for dividing the storage device into the at least two buffers including the transmission buffer and the reception buffer, and a second division arrangement for dividing each of the transmission buffer and the reception buffer into the buffer areas,
wherein the division determining unit determines the first and second division arrangements to set sizes of the buffer areas according to at least one of a line speed of the scanner in a sub scanning direction, a line speed of the plotter in the sub scanning direction, an image data amount or resolution of the plotter in a main scanning direction, a size of packet data for transmitting image data, and a frequency of an error occurrence in transferring image data.

2. An electronic apparatus, comprising:

a plurality of communication apparatuses configured to establish communication with each other, wherein each of the apparatuses includes a scanner configured to scan a document;

a plotter configured to form an image of the scanned document;

a transmission circuit configured to transmit transmission data to a communication counterpart coupled to a port;

a reception circuit configured to receive, via the port, reception data from the communication counterpart;

a storage device configured as at least two buffers including a transmission buffer that stores the transmission data transmitted to the communication counterpart via the port, and a reception buffer that stores the reception data received from the same communication counterpart via the same port;

an address mapping unit configured to perform address mapping of the at least two buffers including the transmission buffer and the reception buffer in the storage device, adjust a storage capacity of the transmission buffer and a storage capacity of the reception buffer, and divide each of the transmission buffer and the reception buffer into buffer areas; and a division determining unit configured to determine a first division arrangement for dividing the storage device into the at least two buffers including the transmission buffer and the reception buffer, and dividing a second division arrangement for each of the transmission buffer and the reception buffer into the buffer areas, wherein the division determining unit determines the first and second division arrangements to set sizes of the buffer areas according to at least one of a line speed of the scanner in a sub scanning direction, a line speed of the plotter in the sub scanning direction, an image data amount or resolution of the plotter in a main scanning direction, a size of packet data for transmitting image data, and a frequency of an error occurrence in transferring image data.

3. The electronic apparatus as claimed in claim 2, wherein each of the communication apparatuses corresponds to an end point or a root complex that establishes communication according to the PCI Express standard.

4. An imaging apparatus, comprising:

a scanner configured to scan a document;

a plotter configured to form an image of the scanned document; and a controller configured to control operations of the scanner and the plotter, wherein each of the scanner, the plotter, and the controller includes a communication apparatus including a transmission circuit configured to transmit transmission data to a communication counterpart coupled to a port;

a reception circuit configured to receive, via the port, reception data from the communication counterpart;

a storage device configured as at least two buffers including a transmission buffer that stores the transmission data transmitted to the communication counterpart via the port, and a reception buffer that stores the reception data received from the same communication counterpart via the same port;

an address mapping unit configured to perform address mapping of the at least two buffers including the transmission buffer and the reception buffer in the storage device, adjust a storage capacity of the transmission buffer and a storage capacity of the reception buffer, and divide each of the transmission buffer and the reception buffer into buffer areas; and a division determining unit configured to determine a first division arrangement for dividing the storage device into the at least two buffers including the transmission buffer and the reception buffer, and a second division arrangement for dividing each of the transmission buffer and the reception buffer into the buffer areas, wherein the division determining unit determines the first and second division arrangements to set sizes of the buffer areas according to at least one of a line speed of the scanner in a sub scanning direction, a line speed of the plotter in the sub scanning direction, an image data amount or resolution of the plotter in a main scanning direction, a size of packet data for transmitting image data, and a frequency of an error occurrence in transferring image data.

5. The imaging apparatus as claimed in claim 4, wherein each of the scanner and the plotter corresponds to an end point configured to establish communication according to the PCI Express standard; and the controller corresponds to a root complex configured to establish communication according to the PCI Express standard.

6. The imaging apparatus as claimed in claim 5, wherein the address mapping unit divides the storage device into the at least two buffers including the transmission buffer and the reception buffer, and divides each of the transmission buffer and the reception buffer into the buffer areas including a posted header area, a posted data area, a non-posted header area, a non-posted data area, a completion header area, and a completion data area.

7. The imaging apparatus as claimed in claim 5, wherein image data are transmitted from the communication apparatus of the scanner to the communication apparatus of the controller via a Memory Write Transaction, and image data are transmitted from the communication apparatus of the controller to the communication apparatus of the plotter via a Memory Read Transaction.

8. The imaging apparatus as claimed in claim 6, wherein the division determining unit is realized by a CPU of the controller.

9. The imaging apparatus as claimed in claim 6, wherein the division determining unit is configured to determine the first and second division arrangements such that the posted header area and the posted data area of the transmission buffer of the scanner and the posted header area and the posted data area of the reception buffer of the controller increase in size as at least one of a line speed and an image amount of the scanner increases.

10. The imaging apparatus as claimed in claim 6, wherein the division determining unit is configured to determine the first and second division arrangements such that the non-posted header area of the transmission buffer of the scanner, the non-posted header area, the completion header area and the completion data area of the transmission buffer of the controller, and the completion header area and the completion data area of the reception buffer of the scanner increase in size as at least one of a line speed and an image amount of the plotter increases.

11. The imaging apparatus as claimed in claim 6,
wherein the division determining unit is configured to determine the first and second division arrangements such that the non-posted header area of the transmission buffer of the plotter and the non-posted header area of the transmission buffer of the controller increase in size as the packet data used for image data transmission by the controller in response to a Memory Read Request from the plotter decrease in size.

12. The imaging apparatus as claimed in claim 6,
wherein the address mapping unit is configured to perform address mapping of a retry buffer on the storage device; and
the division determining unit is configured to determine the first and second division arrangements such that the retry buffer of the scanner or the plotter and the retry buffer of the controller increase in size as the frequency of error occurrence upon transferring image data increases.

13. The imaging apparatus as claimed in claim 6, further comprising:
a detection unit configured to detect an occurrence of a buffer full state of at least one of the buffers or the buffer areas while data transmission is performed;
wherein the division determining unit is configured to determine the first and second division arrangements such that when the occurrence of the buffer full state is detected in the at least one of the buffers or the buffer areas, a storage capacity of said at least one of the buffers or the buffer areas is increased.

14. The imaging apparatus as claimed in claim 13,
wherein the division determining unit determines the first and second division arrangements such that when the occurrence of the buffer full state is detected in at least two of the buffers or the buffer areas, a storage capacity increase rate of one of the at least two buffers or the buffer areas that has a higher buffer full state occurrence rate compared to another one of the at least two buffers or buffer areas is arranged to be higher than a storage capacity increase rate of the other one of the at least two buffers or buffer areas.

15. The imaging apparatus as claimed in claim 13,
wherein the end point is configured to convey a message packet signaling the occurrence of the buffer full state within said end point to the root complex; and
the root complex is configured to convey the occurrence of the buffer full state within said root complex through internal communication.

16. The imaging apparatus as claimed in claim 15,
wherein the root complex is configured to determine a storage capacity arrangement relating to a manner in which the address mapping unit is to adjust the storage capacity of the transmission buffer and the storage capacity of the reception buffer at the end point, and convey the determined storage capacity arrangement to said end point.

* * * * *